United States Patent
Hu et al.

(10) Patent No.: US 10,676,601 B2
(45) Date of Patent: Jun. 9, 2020

(54) POLYOLEFIN BLENDS INCLUDING POLYOCTENE WITH COMPATIBILIZER

(71) Applicant: Dow Global Technologies LLC, Midland, MI (US)

(72) Inventors: Yushan Hu, Pearland, TX (US); Kim L. Walton, Lake Jackson, TX (US); Gary R. Marchand, Maurepas, LA (US); Kyle Anderson, Houston, TX (US); Colin Li Pi Shan, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 157 days.

(21) Appl. No.: 15/758,944

(22) PCT Filed: Sep. 8, 2016

(86) PCT No.: PCT/US2016/050632
§ 371 (c)(1),
(2) Date: Mar. 9, 2018

(87) PCT Pub. No.: WO2017/044533
PCT Pub. Date: Mar. 16, 2017

(65) Prior Publication Data
US 2018/0258266 A1 Sep. 13, 2018

Related U.S. Application Data

(60) Provisional application No. 62/216,504, filed on Sep. 10, 2015.

(51) Int. Cl.
*C08L 23/10* (2006.01)
*C08L 23/08* (2006.01)
*C08F 10/06* (2006.01)
*C08F 10/08* (2006.01)
*C08J 11/04* (2006.01)

(52) U.S. Cl.
CPC .......... *C08L 23/0815* (2013.01); *C08L 23/10* (2013.01); *C08F 10/06* (2013.01); *C08F 10/08* (2013.01); *C08F 2500/04* (2013.01); *C08F 2500/07* (2013.01); *C08F 2800/10* (2013.01); *C08J 11/04* (2013.01); *C08L 2205/035* (2013.01)

(58) Field of Classification Search
CPC ............................ C08L 2205/035; C08L 23/20
See application file for complete search history.

(56) References Cited

U.S. PATENT DOCUMENTS

| | | | |
|---|---|---|---|
| 7,355,089 B2 | 4/2008 | Chang et al. | |
| 7,622,529 B2 | 11/2009 | Walton et al. | |
| 7,906,587 B2 | 3/2011 | Poon et al. | |
| 7,951,882 B2 | 5/2011 | Arriola et al. | |
| 8,084,537 B2 | 12/2011 | Walton et al. | |
| 8,476,393 B2 | 7/2013 | Shan et al. | |
| 8,785,554 B2 | 7/2014 | Li Pi Shan et al. | |
| 8,802,774 B2 | 8/2014 | Carnahan et al. | |
| 8,822,598 B2 | 9/2014 | Li Pi Shan et al. | |
| 8,822,599 B2 | 9/2014 | Li Pi Shan et al. | |
| 9,752,024 B2 | 9/2017 | Barry et al. | |
| 2006/0199930 A1 | 9/2006 | Li Pi Shan et al. | |
| 2007/0167578 A1 | 7/2007 | Arriola et al. | |
| 2007/0254118 A1* | 11/2007 | Opusko | B32B 27/08 428/34.9 |
| 2008/0269412 A1 | 10/2008 | Carnahan et al. | |
| 2008/0311812 A1 | 12/2008 | Arriola et al. | |
| 2011/0313106 A1 | 12/2011 | Shan et al. | |
| 2011/0313107 A1 | 12/2011 | Shan et al. | |
| 2011/0313108 A1 | 12/2011 | Shan et al. | |
| 2014/0174509 A1 | 6/2014 | Bonekamp et al. | |
| 2016/0264765 A1 | 9/2016 | Barry et al. | |

FOREIGN PATENT DOCUMENTS

WO   WO-2015057423 A1 * 4/2015

OTHER PUBLICATIONS

PCT/US2016/050632, International Search Report and Written Opinion dated Oct. 24, 2016.
PCT/US2016/050632, International Preliminary Report on Patentability dated Mar. 13, 2018.

* cited by examiner

*Primary Examiner* — Mark S Kaucher

(57) ABSTRACT

A composition comprising from 10 wt % to 86 wt % of an ethylene component including at least one ethylene based polymer having an ethylene content of at least 50.0 wt %, a melt index from 0.1 g/10 min to 100.0 g/10 min, and a density from 0.935 $g/cm^3$ to 0.965 $g/cm^3$; from 10 wt % to 86 wt % of a propylene component including at least one propylene based polymer having a propylene content of at least 50.0 wt % and a melt flow rate from 0.5 g/10 min to 200.0 g/10 min; from 2 wt % to 22 wt % of an octene component including at least one octene based polymer having an octene content of at least 80 wt %; and from 2 wt % to 20 wt % of a composite component including at least one selected from the group of a crystalline block composite and a specified block composite, derived from at least ethylene and an alpha-olefin.

10 Claims, 1 Drawing Sheet

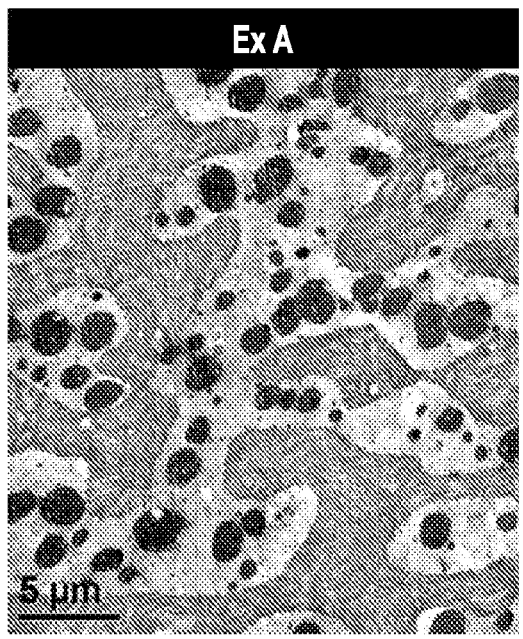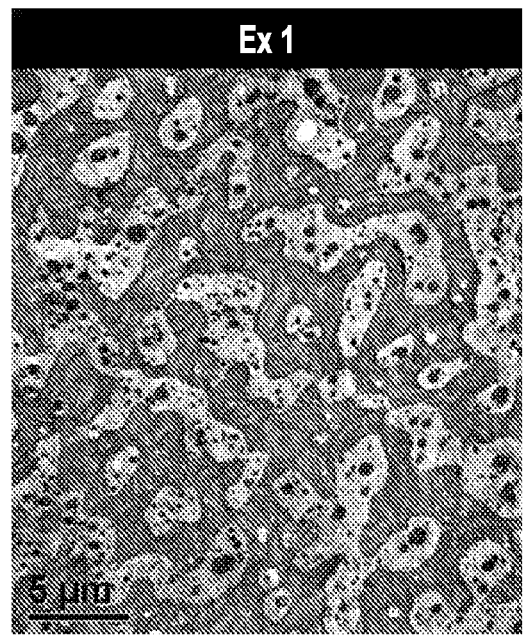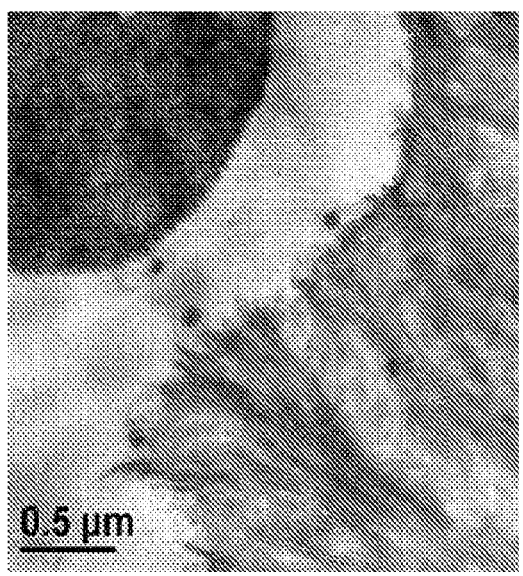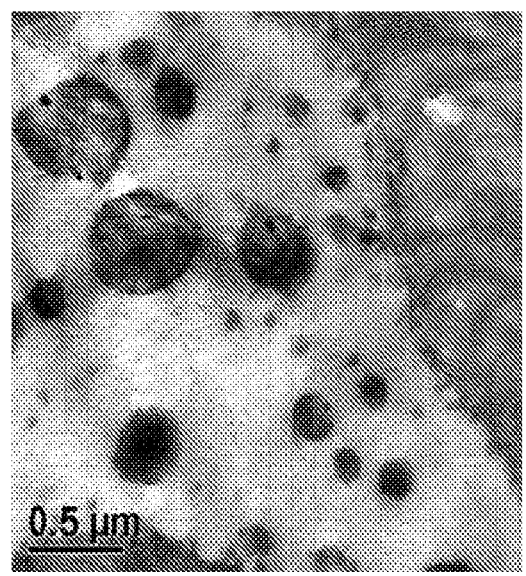

POLYOLEFIN BLENDS INCLUDING POLYOCTENE WITH COMPATIBILIZER

FIELD

Embodiments relates to a polyolefin blend that includes polyoctene with a compatibilizer that is a crystalline block composite (CBC) or a specified block copolymer composition (BC).

INTRODUCTION

Polypropylene (PP) and high density polyethylene (HDPE) blends may be encountered in the post-consumer recycle industry. However, the PP and HDPE may be incompatible with each other in a blend, which could potentially result in an immiscible blend having poor mechanical properties (such as poor impact strength and/or tensile toughness) at various temperatures including temperatures below freezing. Accordingly, it has been proposed that PP/HDPE blends could be modified with elastomers to improve its toughness, but this may occur at the expense other properties. As such, optimized solutions for improving mechanical properties of PP/HDPE blends, with minimized loss of modulus related properties most particularly at temperatures below freezing, are sought.

SUMMARY

Embodiments may be realized by providing a composition comprising:
(A) from 10 wt % to 86 wt % of an ethylene component including at least one ethylene based polymer having an ethylene content of at least 50.0 wt %, based on the total weight of the ethylene based polymer, a melt index from 0.1 g/10 min to 100.0 g/10 min (ASTM D-1238 at 190° C., 2.16 kg), and a density from 0.935 g/cm$^3$ to 0.965 g/cm$^3$;
(B) from 10 wt % to 86 wt % of a propylene component including at least one propylene based polymer having a propylene content of at least 50.0 wt %, based on the total weight of the propylene based polymer, and a melt flow rate from 0.5 g/10 min to 200.0 g/10 min (ASTM D-1238 at 230° C., 2.16 kg);
(C) from 2 wt % to 22 wt % of an octene component including at least one octene based polymer having an octene content of at least 80 wt %, based on the total weight of the octene based polymer; and
(D) from 2 wt % to 20 wt % of a composite component including at least one selected from the group of a crystalline block composite and a specified block composite, derived from at least ethylene and an alpha-olefin that is one of a C3-10 alpha-olefin.

The crystalline block composite includes a crystalline ethylene based polymer having an ethylene content of greater than 90 mol %, a crystalline alpha-olefin based polymer that is derived from at least the alpha-olefin, and a block copolymer comprising a crystalline ethylene block and a crystalline alpha-olefin block, the crystalline ethylene block of the block copolymer having the same composition as the crystalline ethylene based polymer in the block composite, and the crystalline alpha olefin block of the block copolymer having the same composition as the crystalline alpha-olefin based polymer of the block composite, and the specified block composite includes an ethylene based polymer having an ethylene content from 69 mol % and to 90 mol %, an alpha-olefin based polymer that is derived from at least the alpha-olefin, and a block copolymer comprising an ethylene block and an alpha olefin block, the ethylene block of the block copolymer having the same composition as the ethylene based polymer in the block composite, and the alpha olefin block of the block copolymer having the same composition as the alpha-olefin based polymer of the block composite.

BRIEF DESCRIPTION OF THE FIGURES

FIG. 1 is a set of four transmission electron microscope (TEM) images of Working Example 1 and Comparative Example A.

DETAILED DESCRIPTION

Embodiments relate a composition that includes high density ethylene based polymer, a propylene based polymer, a high octene content based polymer, and a crystalline block composite (CBC) and/or specified block composite (BC). The blend may be formed as part of a post-consumer recycle industrial operation, in which the high density ethylene based polymer and the propylene based polymer are first blended as part of a post-consumer recycling stream. Thereafter, the high octene content based polymer and the crystalline block composite (CBC) and/or specified block composite (BC) may be added to/blended with the resultant blend in an effort to improve the properties of a resultant article (e.g., compression molding article and/or injection molding article) formed using the composition.

Terms

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As used with respect to a chemical compound, unless specifically indicated otherwise, the singular includes all isomeric forms and vice versa.

"Composition" and like terms mean a mixture or blend of two or more components. "Blend," "polymer blend," and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer embraces the term homopolymer, usually employed to refer to polymers prepared from only one type of monomer, and the term interpolymer as defined below. It also encompasses all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Units derived from ethylene", "ethylene content", and like terms mean the units of a polymer that formed from the polymerization of ethylene monomers. "Units derived from α-olefin", "alpha-olefin content", "α-olefin content", and like terms mean the units of a polymer that formed from the polymerization of specific α-olefin monomers, in particular at least one of a $C_{3-10}$ α-olefin. "Units derived from propylene", "propylene content", and like terms mean the units of a polymer that formed from the polymerization of propylene monomers.

"Propylene based polymer," and like terms mean a polymer that comprises a majority weight percent polymerized propylene monomer, also referred to as units derived from propylene (based on the total amount of polymerizable monomers), and optionally comprises at least one polymerized comonomer different from propylene (such as at least one selected from a $C_2$ and $C_{4-10}$ α olefin) so as to form a propylene-based interpolymer. For example, when the propylene-based polymer is a copolymer, the propylene content is greater than 50 wt %, based on the total weight of the copolymer.

"Ethylene based polymer" and like terms mean a polymer that comprises a majority weight percent polymerized ethylene monomer, also referred to as units derived from ethylene (based on the total weight of polymerizable monomers), and optionally may comprise at least one polymerized comonomer different from ethylene (such as at least one selected from a $C_{3-10}$ α olefin) so as to form an ethylene-based interpolymer. For example, when the ethylene-based polymer is a copolymer, the amount of ethylene is greater than 50 wt %, based on the total weight to the copolymer.

"Octene based polymer" and the like terms mean a polymer that comprises a majority weight percent polymerized octene polymer, also referred to as units derived from octene (based on the total weight of the polymerizable monomers), and optionally may comprise at least one polymerized comonomer different from octene (such as at least one selected from a $C_{2-7}$ and $C_{9-10}$ α olefin) so as to form an octene-based interpolymer. For example, when the octene-based polymer is a copolymer, the amount of octene is greater than 50 wt %, based on the total weight to the copolymer.

The term "block copolymer" or "segmented copolymer" refers to a polymer comprising two or more chemically distinct regions or segments (referred to as "blocks") joined in a linear manner, that is, a polymer comprising chemically differentiated units, which are joined (covalently bonded) end-to-end with respect to polymerized functionality, rather than in pendent or grafted fashion. The blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property. The block copolymers are characterized by unique distributions of both polymer polydispersity (PDI or Mw/Mn) and block length distribution, e.g., based on the effect of the use of a shuttling agent(s) in combination with catalysts (such as those described in the examples).

The term "crystalline block composite" (CBC) refers to composites comprising a crystalline ethylene based polymer (CEP) having an ethylene content of greater than 90 mol %, a crystalline alpha-olefin based polymer (CAOP), and a block copolymer having a crystalline ethylene block (CEB) and a crystalline alpha-olefin block (CAOB), wherein the CEB of the block copolymer is essentially the same composition as the CEP in the crystalline block composite and the CAOB of the block copolymer is essentially the same composition as the CAOP of the crystalline block composite. The compositional split between the amount of CEP and CAOP will be essentially the same as that between the corresponding blocks in the block copolymer. The alpha-olefin content of the CAOP and the CAOB may be greater than 90 mol %. In exemplary embodiments, the alpha-olefin is propylene. For example, the CAOB and the CEB may an iPP-EP (isotactic polypropylene and ethylene-propylene) diblock copolymer.

The terms "specified block composite" and "block composite" (BC) refer to composites comprising an ethylene based polymer (may be referred to as EP) having an ethylene content from 69 mol % to 90 mol %, an alpha-olefin based polymer (may be referred AOP), and a block copolymer having an ethylene block (may be referred to EB) and an alpha-olefin block (may be referred to as AOB), wherein the ethylene block of the block copolymer is essentially the same composition as the ethylene based polymer in the block composite and the alpha-olefin block of the block copolymer is essentially the same composition as the alpha-olefin based polymer of the block composite. The compositional split between the amount of ethylene based polymer and alpha-olefin based polymer will be essentially the same as that between the corresponding blocks in the block copolymer. The alpha-olefin content of the alpha-olefin based polymer and the alpha-olefin block may be from 61 mol % to 90 mol %. In embodiments, the alpha-olefin is propylene. The block composite differs from the crystalline block composite based on at least the ethylene content in an ethylene based polymer and the ethylene block. For example, the alpha-olefin block and the ethylene block may be an P-E/E-P (propylene-ethylene and ethylene-propylene) diblock copolymer.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline propylene polymers may have, but are not limited to, densities of 0.88 g/cc to 0.91 g/cm$^3$ and melting points of 100° C. to 170° C.

The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

Polyoctene Component

The composition includes from 2 wt % to 22 wt % (e.g., 2 wt % to 20 wt %, 3 wt % to 18 wt %, 3 wt % to 15 wt %, 5 wt % to 15 wt %, 5 wt % to 12 wt %, 5 wt % to 10 wt %, 6 wt % to 9 wt %, 7 wt % to 9 wt %, etc.) of an octene component. The octene component includes at least one octene based polymer having an octene content of at least 80.0 wt % (i.e., units derived from octene), based on the total weight of the octene based polymer. The octene component may include one or more octene based polymers, of which at least one octene based polymer has the octene content of at least 80.0 wt %. In exemplary embodiments, each of the one or more octene based polymers of the octene component has the octene content of at least 80 wt %.

For example, the octene content may be at least 85.0 wt %, at least 90.0 wt %, at least 95.0 wt %, at least 98.0 wt %, at least 99.0 wt %, and/or at least 99.9 wt %, based on the total weight of the octene based polymer. In exemplary embodiments, the octene content may be at least 54 mol %, based on the total weight of the octene based polymer.

The octene based polymer may be a copolymer with an alpha olefin content of less than 20.0 wt % (e.g., less than 15.0 wt %, less than 10.0 wt %, less than 5.0 wt %, less than 2.0 wt %, less than 1.0 wt %, and/or less than 0.1 wt %), whereas the alpha olefin is at least one selected from the group of $C_{2-7,9,\text{ and }10}$ alpha-olefins (e.g., the alpha olefin is ethylene and/or propylene). The octene based polymer may be derived from one or more alpha-olefins ($C_{2-7,9,\text{ and }10}$) in addition to the octene. The octene based polymer may be differentiated from some ethylene-octene copolymers based on the high octene content of at least 80.0 wt %. In exemplary embodiments, the alpha olefin is excluded or less than 5.0 wt %.

The one or more octene based polymers may be prepared in one or more reactors (e.g., a continuous stirred tank reactor—CSTR) using at least octene as a monomer (an optional another alpha-olefin as additional monomer/comonomer), a solvent, a catalyst, a cocatalyst-1, and a cocatalyst-2 that are flowed to the reactor. In exemplary embodiments, the octene based polymer is prepared in a single reactor.

Crystalline Block Composite and Block Composite

The amount of crystalline block composite and/or specified block composite in the composition is from 2 wt % to 20 wt %, from 2 wt % to 15 wt %, from 3 wt % to 10 wt %, and/or from 3 wt % to 7 wt %, based on the total weight of the composition. In embodiments, the composition includes at least one selected from the group of the crystalline block composite and/or the specified block composite such that only the crystalline block composite may be included, only the specified block composite may be included, and/or a combination of both the crystalline block composite and the specified block composite may be included. In exemplary embodiments, the crystalline block composite and/or specified block composite may each have a total ethylene content that is from 40 wt % to 70 wt % (e.g., 40 wt % to 65 wt %, 45 wt % to 65 wt %, 45 wt % to 60 wt %, 50 wt % to 55 wt %, etc.), based on the total weight of the crystalline block composite or the specified block composite. The remainder of the total weight of the crystalline block composite and/or specified block composite may be accounted for by units derived from at least one $C_{3-10}$ α-olefin (referring to a comonomer content). For example, the remainder of the total weight may be accounted for by united derived from propylene.

The crystalline block composite (CBC) includes the crystalline ethylene based polymer (CEP), the crystalline alpha-olefin based polymer (CAOP), and the block copolymer having the crystalline ethylene block (CEB) and the crystalline alpha-olefin block (CAOB), where the CEB is essentially the same composition as the CEP and the CAOB is essentially the same composition as the CAOP. The alpha-olefin may be referred to as the comonomer, and the amount of which accounts for a comonomer content. In the crystalline block composite, the alpha-olefin is at least one selected from the group of $C_{3-10}$ α-olefins (e.g., may be propylene and/or butylene). The CAOP and the CAOB may have an alpha-olefin content that is greater than 90 mol %. The CEB comprises greater than 90 mol % of units derived from ethylene (i.e., ethylene content), and any remainder may be at least one of selected from the group of $C_{3-10}$ α-olefins as a comonomer (in an amount less than 10 mol %, less than 7 mol %, less than 5 mol %, less than 3 mol %, etc.).

In exemplary embodiments, the CAOP includes propylene, e.g., greater than 90 mol % units derived from propylene and any remainder may be ethylene and/or at least one of selected from the group of $C_{4-10}$ α-olefins as a comonomer (in an amount less than 10 mol %, less than 7 mol %, less than 5 mol %, less than 4 mol %, less than 4 mol %, etc.). When the CAOB includes propylene, as does the CAOP, and may additional comprise ethylene as a comonomer. Further, the CEB and CEP may comprise propylene as a comonomer. The compositional split between the amount of CEP and CAOP will be essentially the same as that between the corresponding blocks in the block copolymer. The CEB and the CAOB may be referred to as hard (crystalline) segments/blocks.

In exemplary embodiments, the CAOB refers to highly crystalline blocks of polymerized alpha olefin units in which the monomer that is one of $C_{3-10}$ α-olefins (such as propylene) is present in an amount greater than 93 mol %, greater than 95 mol %, and/or greater than 96 mol %. In other words, the comonomer content (e.g., ethylene content) in the CAOBs is less than less than 7 mol %, less than 5 mol %, and/or less than 4 mol %. CAOBs with propylene crystallinity may have corresponding melting points that are 80° C. and above, 100° C. and above, 115° C. and above, and/or 120° C. and above. In exemplary embodiments, CEB refers to blocks of polymerized ethylene units in which the comonomer content (such as propylene) is 7 mol % or less, between 0 mol % and 5 mol %, and/or between 0 mol % and 3 mol %. In exemplary embodiments, the CAOB comprise all or substantially all propylene units. Such CEBs may have corresponding melting points that are 75° C. and above, 90° C. and above, and/or 100° C. and above.

The crystalline block composite may include from 0.5 wt % to 95.0 wt % CEP, from 0.5 wt % to 95.0 wt % CAOP, and from 5.0 wt % to 99.0 wt % of the crystalline block copolymer. For example, the crystalline block composite may include from 5.0 wt % to 80.0 wt % CEP, from 5.0 wt % to 80.0 wt % CAOP, and from 20.0 wt % to 90.0 wt % of the crystalline block copolymer. Weight percents are based on total weight of crystalline block composite. The sum of the weight percents of CEP, CAOP, and the crystalline block copolymer equals 100%. An exemplary measurement of the relative amount of the crystalline block copolymer is referred to as the Crystalline Block Composite Index (CBCI). The CBCI for the crystalline block composite is greater than 0 and less than 1.0. For example, the CBCI is from 0.20 to 0.99, from 0.30 to 0.99, from 0.40 to 0.99, from 0.40 to 0.90, from 0.40 to 0.85, from 0.50 to 0.80, and/or from 0.55 to 0.75.

The crystalline block composite may have, a Tm greater than 90° C. (e.g., for both a first peak and a second peak), a Tm greater than 100° C. (e.g., for both a first peak and a second peak), and/or greater than 120° C. (e.g., for at least one of a first peak and a second peak). For example, the Tm is in the range of from 100° C. to 250° C., from 110° C. to 220° C., and/or from 115° C. to 220° C. According to an exemplary embodiment, the crystalline block composite exhibits a second peak Tm in a range from 100° C. to 130° C. (e.g., 100° C. to 120° C., 100° C. to 110° C., etc.) and a first peak Tm in a range from 110° C. to 150° C. (e.g., 110° C. to 140° C., 115° C. to 130° C., 115° C. to 125° C., etc.), in which the second peak Tm is less than the first peak Tm.

The crystalline block composite may have a weight average molecular weight (Mw) from 10,000 g/mol to 2,500,000 g/mol, from 35000 g/mol to 1,000,000 g/mol, from 50,000 g/mol to 300,000 g/mol, and/or from 50,000 g/mol to 200,000 g/mol. For example, the Mw may be from 20 kg/mol to 1000 kg/mol, from 50 kg/mol to 500 kg/mol, and/or from 80 kg/mol to 125 kg/mol.

The specified block composite (BC) includes the ethylene based polymer (may be referred to as EP), the alpha-olefin based polymer (may be referred to as AOP), and the block copolymer having the ethylene block (may be referred to EB) and the alpha-olefin block (may be referred to as AOB), where ethylene based polymer the is essentially the same composition as the ethylene block of the block copolymer and the alpha-olefin based polymer is essentially the same composition as the alpha-olefin block of the block copolymer. In the specified block composite, the alpha-olefin is at least one selected from the group of $C_{3-10}$ α-olefins (e.g., may be propylene and/or butylene).

The alpha-olefin based polymer and the alpha-olefin block of the specified block composite may have an alpha-olefin content that is from 61 mol % to 90 mol % (e.g., 65 mol % to 88 mol %, 70 mol % to 88 mol %, 75 mol % to 86 mol %, 80 mol % to 85 mol %, etc.). The remainder may be essentially accounted for with at least one selected from the group of $C_2$-$C_{4-10}$ α-olefins as comonomers. For example, the remainder may be essentially accounted for with units derived from ethylene, e.g., such that the ethylene content is from 10 mol % to 39 mol % (e.g., 14 mol % to 25 mol %, 15 mol % to 20 mol %, etc.). Said in another way, the alpha-olefin based polymer and the alpha-olefin block may have an alpha-olefin content (such as propylene content) that is from 70 wt % to 93 wt % (e.g., 75 wt % to 90 wt %, 80 wt % to 89 wt %, 85 wt % to 89 wt %, etc.).

The ethylene based polymer and ethylene block of the block copolymer of the specified block composite may have an ethylene content from 69 mol % to 90 mol % (e.g., 75 mol % to 88 mol %, 80 mol % to 88 mol %, etc.). The remainder may be essentially accounted for with at least one selected from the group of $C_{3-10}$ α-olefins as a comonomer, e.g., such that the comonomer content from 10 mol % to 31 mol %, 12 mol % to 20 mol %, etc.). Said in another way, the ethylene content of ethylene based polymer and ethylene block of the block copolymer may be from 60 wt % to 85 wt % (e.g., from 67 wt % to 83 wt %, from 73 wt % to 83 wt %, etc.)

In exemplary embodiments, the alpha-olefin based polymer and the alpha-olefin block of the block copolymer in the specified block composite includes propylene. For example, the propylene content is from 61 mol % to 90 mol % (e.g., 65 mol % to 88 mol %, 70 mol % to 88 mol %, 75 mol % to 86 mol %, 80 mol % to 85 mol %, etc.). The alpha-olefin based polymer and the alpha-olefin block of the block copolymer and may additional comprise ethylene as a comonomer. Further, the ethylene based polymer and the ethylene block of the block copolymer may comprise propylene as a comonomer. The compositional split between the amount of ethylene based polymer and the alpha-olefin based polymer will be essentially the same as that between the corresponding blocks in the block copolymer. The ethylene block and the alpha-olefin block may be referred to as semi-crystalline and/or amorphous segments/blocks.

The specified block composite differs from the crystalline block composite in view of the lower mole percent of ethylene in the ethylene based polymer (EP relative to CEP) and the ethylene block (EB relative to CEB) of the corresponding block copolymer. The specified block composite may also differ from the crystalline block composite in view of the lower mole percent of an alpha-olefin (such as propylene) in the alpha-olefin based polymer (AOP relative to CAOP) and the alpha-olefin block (AOB relative to CAOB).

The specified block composite may include from 0.5 wt % to 95.0 wt % EP, from 0.5 wt % to 95.0 wt % AOP, and from 5.0 wt % to 99.0 wt % of the block copolymer. For example, the block composite may include from 5.0 wt % to 80.0 wt % EP, from 5.0 wt % to 80.0 wt % AOP, and from 20.0 wt % to 90.0 wt % of the block copolymer. Weight percents are based on total weight of block composite. The sum of the weight percents of EP, AOP, and the block copolymer equals 100%. An exemplary measurement of the relative amount of the block copolymer is referred to as the Modifier Block Composite Index (MBCI). The MBCI is based on HTLC separation (e.g., not xylene separation) to isolate unbounded polypropylene in the block composite, and the methodology and assumptions are similar to the CBCI calculation. The MBCI for the block composite is greater than 0 and less than 1.0. For example, the MBCI is from 0.20 to 0.99, from 0.30 to 0.99, from 0.40 to 0.99, from 0.40 to 0.90, from 0.40 to 0.85, from 0.50 to 0.80, from 0.55 to 0.75, and/or from 0.60 to 0.70.

The MFR (melt flow rate) of the specified block composites and crystalline block composites may be from 0.1 to 1000 dg/min (230° C./2.16 kg), from 1 to 500 dg/min (230° C./2.16 kg), from 3 to 30 dg/min (230° C./2.16 kg), and/or from 5 to 11 dg/min (230° C./2.16 kg).

Crystalline block composites and specified block composites may be differentiated from conventional, random copolymers, physical blends of polymers, and block copolymers prepared via sequential monomer addition. The crystalline block composites and the specified block composites may be differentiated from random copolymers and from a physical blend by characteristics such as crystalline block composite index, modified block composite index, better tensile strength, improved fracture strength, finer morphology, improved optics, and/or greater impact strength at lower temperature. The crystalline block composites and the specified block composites may be differentiated from block copolymers prepared by sequential monomer addition by molecular weight distribution, rheology, shear thinning, rheology ratio, and block polydispersity. A unique feature of crystalline block composites and/or the specified block composites may be that they cannot be fractionated by conventional means by solvent or temperature such as xylene fractionation, solvent/non-solvent, or temperature rising elution fractionation or crystallization elution fractionation.

When produced in a continuous process, the crystalline block composites and the specified block composites desirably possess PDI from 1.7 to 15 (e.g., from 1.8 to 10, from 2.0 to 5, and/or from 2.5 to 4.8). Exemplary crystalline block composites are described in, e.g., US Patent Application Publication Nos. 2011-0313106, 2011-0313108, and 2011-0313108, all published on Dec. 22, 2011, incorporated herein by reference with respect to descriptions of the crystalline block composites, processes to make them, and methods of analyzing them. In exemplary embodiments, the crystalline block composite may have a molecular weight distribution (MWD), defined as weight average molecular weight divided by number average molecular weight ($M_w/M_n$) of 5.0 or less, from 3.0 to 4.8, and/or from 3.0 to 4.0. Exemplary specified block composites are described in, e.g., U.S. Patent Application Publication Nos. 2014/0174509, incorporated herein by reference with respect to descriptions of the crystalline block composites, processes to make them, and methods of analyzing them. In exemplary embodiments, the specified block composite may have a molecular weight distribution (MWD), defined as weight average molecular weight divided by number average molecular weight ($M_w/M_n$) of 5.0 or less, 4.0 or less, 3.0 or less, from 2.0 to 4.0, from 2.0 to 3.0, and/or from 2.0 to less than 3.0. The $M_w/M_n$ may be lower for the specified block composite relate to the crystalline block composite.

The crystalline block composite polymers and the specified block composite polymers may be prepared by a process comprising contacting an addition polymerizable monomer or mixture of monomers under addition polymerization conditions with a composition comprising at least one addition polymerization catalyst, at least one cocatalyst, and a chain shuttling agent, said process being characterized by formation of at least some of the growing polymer chains under differentiated process conditions in two or more reactors operating under steady state polymerization conditions or in two or more zones of a reactor operating under plug flow polymerization conditions. The term, "shuttling agent" refers to a compound or mixture of compounds that is capable of causing polymeryl exchange between at least two active catalyst sites under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In a preferred embodiment, the block composites and crystalline block composites comprise a fraction of block polymer which possesses a most probable distribution of block lengths.

Suitable processes useful in producing the crystalline block composites and the specified block composites and may be found, e.g., in U.S. Patent Application Publication No. 2008/0269412, published on Oct. 30, 2008. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. The chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

For example, when producing a block copolymer having the crystalline ethylene block (CEB) and the crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It may be more advantageous to produce CEB in the first reactor or zone with fresh chain shuttling agent added. The presence of increased levels of ethylene in the reactor or zone producing CEB may lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments. Similar, when producing a block copolymer having the ethylene block (EB) and the alpha-olefin block (AOB), two reactors or zones may be used.

When operating reactors or zones in series it is necessary to maintain diverse reaction conditions such that one reactor produces CEB (or EB) and the other reactor produces CAOB (or AOB). Carryover of ethylene from the first reactor to the second reactor (in series) or from the second reactor back to the first reactor through a solvent and monomer recycle system is preferably minimized There are many possible unit operations to remove this ethylene, but because ethylene is more volatile than higher alpha olefins one simple way is to remove much of the unreacted ethylene through a flash step by reducing the pressure of the effluent of the reactor producing CEB (or EB) and flashing off the ethylene. A more preferable approach is to avoid additional unit operations and to utilize the much greater reactivity of ethylene versus higher alpha olefins such that the conversion of ethylene across the CEB (or EB) reactor approaches 100%. With respect to the CAOB (or AOB), the overall conversion of monomers across the reactors may be controlled by maintaining the alpha-olefin conversion at a high level (90 to 95%).

Exemplary catalysts and catalyst precursors for use to from the crystalline block composite include metal complexes such as disclosed in WO2005/090426. Other exemplary catalysts for forming block composites are also disclosed in US Patent Publication Nos. 2006/0199930, US 2007/0167578, and US 2008/0311812; U.S. Pat. No. 7,355,089; and International Publication No. WO 2009/012215.

Ethylene Component

The composition includes from 10 wt % to 86 wt % (e.g., 15 wt % to 80 wt %, 20 wt % to 75 wt %, 20 wt % to 70 wt %, 20 wt % to 65 wt %, 20 wt % to 60 wt %, etc) of an ethylene component. The ethylene component includes one or more ethylene based polymers having an ethylene content of at least 50.0 wt %, based on the total weight of the ethylene based polymer. The one or more ethylene based polymers have a melt index from 0.1 g/10 min to 100 g/10 min (e.g., from 0.3 g/10 min to 80.0 g/10 min, 0.3 g/10 min to 50.0 g/10 min, 0.3 g/10 min to 30.0 g/10 min, 0.3 g/10 min to 20.0 g/10 min, 0.5 g/10 min to 10.0 g/10 min, 0.5 g/10 min to 5.0 g/10 min, etc.), according to ASTM D-1238 at 190° C., 2.16 kg. The ethylene based polymers have a density from 0.935 g/cm$^3$ to 0.965 g/cm$^3$ (e.g., 0.945 g/cm$^3$ to 0.965 g/cm$^3$, 0.950 g/cm$^3$ to 0.965 g/cm$^3$, 0.950 g/cm$^3$ to 0.963 g/cm$^3$, etc.), such that the ethylene based polymer is a high density polyethylene based polymer (HDPE).

The ethylene component may include only HDPE type ethylene based polymers, or may include a combination of HDPE with other ethylene based polymers. Exemplary other ethylene based polymers include ultralow density polyethylene (ULDPE), low density polyethylene (LDPE), linear low density polyethylene (LLDPE), medium density polyethylene (MDPE), high melt strength high density polyethylene (HMS-HDPE), ultrahigh density polyethylene (UHDPE), and combinations thereof. In exemplary embodiments, the ethylene component includes at least 50 wt %, 60 wt %, 70 wt %, 80 wt %, 90 wt %, 95 wt %, 99 wt %, etc., and/or includes 100 wt % of HDPE type ethylene based polymers, based on the total amount of one or more ethylene based polymers in the ethylene component.

The composition may be rich in the ethylene component (i.e., present in an higher amount by weight percent relative to the propylene component) to form an ethylene rich composition. In an ethylene rich composition the amount of the ethylene component may be from 40 wt % to 86 wt %, 40 wt % to 80 wt %, 40 wt % to 75 wt %, 40 wt % to 70 wt %, 42 wt % to 68 wt %, etc. Alternatively, the composition may be rich in the propylene component (i.e., present in a lower amount by weight percent relative to the propylene component) to form a propylene rich composition. In a propylene rich composition the amount of the ethylene component may be from 15 wt % to 45 wt %, 15 wt % to 40 wt %, 20 wt % to 40 wt %, 23 wt % to 36 wt %, etc.).

The number average molecular weight (Mw) of the ethylene based polymers in the ethylene component may be at least 5,000, at least 10,000, at least 15,000, at least 20,000, at least 25,000, and/or at least 30,000 grams per mole (g/mol). The maximum Mw of the ethylene based polymers may be less than 100,000 and/or less than 60,000 g/mol. The molecular weight distribution or polydispersity or Mw/Mn of these polymers may be less than 5, between 1 and 5, and/or between 1.5 and 4. Weight average molecular weight (Mw) and number average molecular weight (Mn) are well known in the polymer art and can be determined by know methods.

The ethylene-based polymer may have a crystallinity in the range of from at least 1 percent by weight (a heat of fusion (Hf) of at least 2 Joules/gram (J/g)) to 30 percent by weight (a Hf of less than 50 J/g). For example, the crystallinity range may be from 5% to 25%, from 10% to 20%, and/or from 12% to 18%.

Exemplary ethylene based polymers may include an ethylene/alpha-olefin interpolymer. The ethylene-based polymers are formed without the use of a chain shuttling agent, as discussed below with respect to the crystalline block composite. Such interpolymers include polymers polymerized from at least two different monomers. They include, e.g., copolymers, terpolymers and tetrapolymers. Exemplary, interpolymers are prepared by polymerizing ethylene with at least one comonomer, such as an alpha-olefin (α-olefin) of 3 to 20 carbon atoms ($C_3$-$C_{20}$), 4 to 20 carbon atoms ($C_4$-$C_{20}$), 4 to 12 carbon atoms ($C_4$-$C_{12}$), 4 to 10 carbon atoms ($C_4$-$C_{10}$), and/or 4 to 8 carbon atoms ($C_4$-$C_8$). The alpha-olefins include, but are not limited to, 1-butene, 1-pentene, 1-hexene, 4-methyl-1-pentene, 1-heptene, and 1-octene. In embodiments, alpha-olefins such as 1-butene, 1 pentene, 1-hexene, 4-methyl-1-pentene, 1-heptene, and/or 1-octene are used. The alpha-olefin may be a $C_4$-$C_8$ alpha-olefin.

Exemplary, interpolymers include ethylene/propylene (EP), ethylene/butene (EB) copolymers, ethylene/hexene (EH), ethylene/octene (EO) copolymers, ethylene/alpha-olefin/diene modified (EAODM) interpolymers such as ethylene/propylene/diene modified (EPDM) interpolymers, and ethylene/propylene/octene terpolymers. In exemplary embodiments, at least one of the EP, EB, EH, and EO copolymers are used in the hot melt adhesive composition.

In exemplary embodiments, the ethylene based polymers may be branched and/or unbranched interpolymers. The presence or absence of branching in the ethylene based interpolymers, and if branching is present, the amount of branching, can vary widely, and may depend on the desired processing conditions and the desired polymer properties. Exemplary types of long chain branching (LCB) in the interpolymers include T-type branching and H-type branching.

Propylene Component

The composition includes from 10 wt % to 86 wt % (e.g., 15 wt % to 80 wt %, 20 wt % to 75 wt %, 20 wt % to 70 wt %, 20 wt % to 65 wt %, 20 wt % to 60 wt %, etc) of a propylene component. The propylene based component includes one or more propylene based polymers having a propylene content of at least 50.0 wt %, based on the total weight of the propylene based polymer. The one or more propylene based polymer has a melt flow rate from 0.1 g/10 min to 100.0 g/10 min (e.g., from 0.1 g/10 min to 80.0 g/10 min, 0.1 g/10 min to 50.0 g/10 min, 0.1 g/10 min to 30.0 g/10 min, 0.5 g/10 min to 20.0 g/10 min, 1.0 g/10 min to 15.0 g/10 min, 3.0 g/10 min to 12.0 g/10 min, etc.), according to ASTM D-1238 at 230° C., 2.16 kg. The propylene based polymer may have a density from 0.870 $g/cm^3$ to 0.910 $g/cm^3$ (e.g., 0.880 $g/cm^3$ to 0.905 $g/cm^3$, 0.885 $g/cm^3$ to 0.905 $g/cm^3$, 0.890 $g/cm^3$ to 0.905 $g/cm^3$, etc.)

Each of the one of more propylene based polymers may be a propylene homopolymer, propylene based interpolymers, a random copolymer polypropylene (RCPP), an impact copolymer polypropylene (e.g., homopolymer propylene modified with at least one elastomeric impact modifier) (ICPP), a high impact polypropylene (HIPP), a high melt strength polypropylene (HMS-PP), an isotactic polypropylene (iPP), a syndiotactic polypropylene (sPP), or a combination thereof. In exemplary embodiments, the one or more propylene based polymers may be in the isotactic form of homopolymer polypropylene, although other forms of polypropylene may be used (e.g., syndiotactic or atactic).

Exemplary propylene based interpolymers (such as RCPP), may contain 1 wt % and up to 50 wt % of ethylene and/or an alpha-olefin comonomer of 4 to 20 carbon atoms (e.g., $C_2$ and $C_4$-$C_{10}$ alpha-olefins). All individual values and subranges from 1 and up to 50 wt % are included herein and disclosed herein; e.g., the comonomer content can be from a lower limit of 1 wt %, 3 wt %, 4 wt %, 5 wt %, 7 wt %, or 9 wt % to an upper limit of 40 wt %, 35 wt %, 30 wt %, 27 wt %, 20 wt %, 15 wt %, 12 wt %, or 9 wt %. For example, the propylene/alpha-olefin copolymer comprises from 1 to 35 wt %, 1 to 30 wt %, 3 to 27 wt %, 3 to 20 wt %, and/or 3 to 15 wt % of one or more alpha-olefin comonomers.

The one or more propylene-based polymers are formed without the use of a chain shuttling agent, as discussed below with respect to the crystalline block composite and the specified block composite. Exemplary comonomers for polymerizing with propylene include ethylene, 1-butene, 1 pentene, 1-hexene, 1-heptene, 1-octene, 1-nonene, 1-decene, 1-unidecene, 1 dodecene, as well as 4-methyl-1-pentene, 4-methyl-1-hexene, 5-methyl-1-hexene, vinylcyclohexane, and styrene. Exemplary comonomers include ethylene, 1-butene, 1-hexene, and 1-octene. Exemplary propylene based interpolymers include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene. Optionally, the propylene-based polymer include a monomer having at least two double bonds such as dienes or trienes.

An exemplary discussion of various polypropylene polymers is contained in Modern Plastics Encyclopedia/89, mid October 1988 Issue, Volume 65, Number 11, PP. 86-92, the entire disclosure of which is incorporated herein by reference. Examples of such propylene based polymers include VERSIFY™ (available from The Dow Chemical Co.), Vistamaxx™ (available from Exxon Mobil), INSPIRE™ (available from Braskem), and Pro-Fax (available from LyondellBasell).

In exemplary embodiments, the propylene-based polymer may be a propylene-alpha-olefin copolymer, which is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93.

Similarly as discussed with respect to the ethylene-based polymers, the propylene-based polymers may contain LCB. For example, the propylene-based polymer may contain an average of at least 0.001, an average of at least 0.005 and/or an average of at least 0.01, long chain branches/1000 total carbons. The term long chain branch, as used herein, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length.

Composition

The composition may be useful for preparing articles using known processes. For example, the compositions may be fabricated into parts, sheets or other article of manufacture, using any extrusion, calendering, blow molding, compression molding, injection molding, or thermoforming processes. The components of the composition may be fed to the process either pre-mixed, or the components may be fed directly into the process equipment, such as a converting extruder, such that the composition is formed therewithin. The compositions may be blended with another polymer, prior to fabrication of an article. Such blending may occur by any of a variety of conventional techniques, one of which is dry blending of pellets of the compositions with pellets of another polymer. The compositions may be compounded using, for example, a twin screw extruder, batch mixer, or single screw extruder.

The compositions may optionally include one or more additives and/or fillers. Non-limiting examples of additives and/or fillers include plasticizers, thermal stabilizers, light stabilizers (e.g., UV light stabilizers and absorbers), antioxidants, slip agents, process aids, optical brighteners, antistats, lubricants, catalysts, rheology modifiers, biocides, corrosion inhibitors, dehydrators, organic solvents, colorants (e.g., pigments and dyes), surfactants, antiblocking agents, nucleating agents, flame retardants and combinations thereof.

The composition may be a post-consumer recycled (PCR) blend. For example, the PCR blend may be used for preparing articles alone or in combination with non-recycled (fresh/virgin) polymer resins. The composition may form a post-consumer plastic resin that is combinable with non-recycled plastic resins, e.g., at a ratio from 1:99 to 99:1 (e.g., from 20:80 to 80:20, from 40:60 to 60:40, etc.), to form a resin composition for preparing an article.

EXAMPLES

Test Methods

Density is measured in accordance with ASTM D-792. The result is reported in gamma (g) per cubic centimeter, or g/cc.

Melt index (MI) is measured in accordance with ASTM D-1238 (190° C.; 2.16 kg). The result is reported in grams/10 minutes.

Melt flow rate (MFR) is measured in accordance with ASTM D-1238 (230° C.; 2.16 kg). The result is reported in grams/10 minutes.

Tensile Properties are measured using ASTM D-1708 microtensile specimens or ASTM D-638. For ASTM D-1708, the gauge length of the samples is 22 mm and samples are stretched with an Instron® at 554% min-1 at 23° C. Tensile strength, tensile strain, and percent elongation at break are reported for an average of 5 specimens. For the compression molded examples, the plaques used for microtensile test are prepared by compression molding using a Tetrahedron press. The polymer is pre-melted at 190° C. for 1 minute at 5 klb and then pressed for 5 minutes at 30 klb and then quenched to ice water bath. The nominal plaque thickness was 2.9 mm. For ASTM D-638, the gauge length of samples is 25 mm and the samples are stretched with an Instron® at 20 in/min at 23° C. Tensile strength, tensile strain, and percent elongation at break are reported for an average of 5 specimens. The plaques used for testing of tensile properties are prepared by injection molding and the tensile bars are cut from the plaque (type IV) in the cross direction.

Izod Impact, including at 23° C., at 0° C., and at −18° C. are measured according to ASTM D-256, at a thickness as indicated in the respective examples. Samples are preparing by compressing molding or injection molding. For compression molding, the samples are cut from the same plaques used for tensile test to have the dimensions 63.5 mm×12.7 mm×2.9 mm. The samples are notched using a notcher to produce a notch depth 2.54+/−0.05 mm in accordance with ASTM D-256. Five specimens of each sample are tested at 23° C. and at 0° C. For injection molding, the samples are cut from the same plaques used for tensile test to have the dimensions 63.5 mm×12.7 mm×2.9 mm. The samples are notched using a notcher to produce a notch depth 2.54+/−0.05 mm in accordance with ASTM D-256. Five specimens of each sample are tested at 23° C., 0° C. and −18° C.

Molecular weight distribution (MWD) is measured using Gel Permeation Chromatography (GPC). In particular, conventional GPC measurements are used to determine the weight-average (Mw) and number-average (Mn) molecular weight of the polymer, and to determine the MWD (which is calculated as Mw/Mn). Samples are analyzed with a high-temperature GPC instrument (Polymer Laboratories, Inc. model PL220). The method employs the well-known universal calibration method, based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M\text{polyethylene} = a*(M\text{polystyrene})^b.$$

In this equation, a=0.4316 and b=1.0 (as described in Williams and Ward, J. Polym. Sc., Polym. Let., 6, 621 (1968)). Polyethylene equivalent molecular weight calculations were performed using VISCOTEK TriSEC software Version 3.0.

Differential Scanning calorimetry (DSC) is used to measure crystallinity in the polymers (e.g., polyethylene (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

High Temperature Liquid Chromatography: High Temperature Liquid Chromatography Experimental Method Instrumentation is the HTLC experiment, which is done according to the published method with minor modifications (Lee, D.; Miller, M. D.; Meunier, D. M.; Lyons, J. W.; Bonner, J. M.; Pell, R. J.; Shan, C. L. P.; Huang, T. *J. Chromatogr. A* 2011, 1218, 7173). Two Shimadzu (Columbia, Md., USA) LC-20AD pumps are used to deliver decane and trichlorobenzene (TCB) respectively. Each pump is connected to a 10:1 fixed flow splitter (Part #: 620-PO20-HS, Analytical Scientific Instruments Inc., CA, USA). The splitter has a pressure drop of 1500 psi at 0.1 mL/min in $H_2O$ according to the manufacturer. The flow rates of both pumps are set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-μL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 μm particle size) is connected between the injector and a 10-port VICI valve (Houston, Tex., USA). The valve is equipped with two 60-μL sample loops. The valve is used to continuously sample eluent from the first dimension (D1) HTLC column to the second dimension (D2) SEC column. The pump of Waters GPCV2000 and a PLgel Rapid™-M column (10×100 mm, 5 μm particle size) are connected to the VICI valve for D2 size exclusion chromatography (SEC). The symmetric configuration is used for the connections as described in the literature (Brun, Y.; Foster, P. *J. Sep. Sci.* 2010, 33, 3501). A dual-angle light scattering detector (PD2040, Agilent, Santa Clara, Calif., USA) and an IRS inferred absorbance detector are connected after the SEC column for measurement of concentration, composition, and molecular weight.

Separation for HTLC:
Approximately 30 mg are dissolved in 8-mL decane by gently shaking the vial at 160° C. for 2 hours. The decane contains 400 ppm BHT (2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IRS detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-μL aliquot of sample solution is injected into the HTLC column. The injection triggers the gradient described below:

From 0-10 min, 100% decane/0% TCB;
From 10-651 min, TCB is increased linearly from 0% TCB to 80% TCB.

The injection also triggers the collection of the light scattering signal at 15° angle (LS15) and the "measure" and "methyl" signals from IRS detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC:
The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit is adjusted to repeat the process.

Each SEC chromatogram n from 1 to 217 yields an X-Y pair in the HTLC chromatogram, where n is the fraction number:

$$X_n = \text{elution volume (mL)} = D1 \text{ flow rate} \times n \times t_{switch}$$

where $t_{switch}$=3 min is the switch time of the 10-port VICI valve.

$$Y_n = \text{signal intensity (Voltage)} = \sum_{peak\ start}^{peak\ end} IR_{measure,n}$$

The above equation uses $IR_{measure}$ signal as the example. The obtained HTLC chromatogram shows the concentrations of the separated polymeric components as a function of elution volume. The normalized $IR_{measure}$ HTLC chromatogram includes Y represented by dW/dV, meaning the normalized weight fractions with respect to the elution volume.

X-Y pairs of data are also obtained from $IR_{methyl}$ and LS15 signals. The ratio of $IR_{methyl}/IR_{measure}$ is used to calculate composition after calibration. The ratio of $LS15/IR_{measure}$ is used to calculate weight-average molecular weight ($M_w$) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IRS detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, $\Omega$, is determined from the total LS15 signals ($A_{LS15}$) and the total $IR_{measure}$ signals ($A_{IR,measure}$):

$$\Omega = \frac{A_{LS15}}{A_{IR,measure} M_w}$$

The experimental $LS15/IR_{measure}$ ratio is then converted to $M_w$ through $\Omega$.

$C^{13}$ Nuclear Magnetic Resonance (NMR): For Sample Preparation, samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

For Data Acquisition Parameters, data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non-spinning samples in locked mode. Samples are homogenized immediately prior to insertion into the heated (130° C.) NMR Sample changer, and are allowed to thermally equilibrate in the probe for 15 minutes prior to data acquisition. The NMR may be used to determine total weight percent of ethylene, e.g., with respect to the crystalline block composite index and modified block composite index discussed below.

Gel permeation chromatographic (GPC) system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polypropylene} = 0.645(M_{polystyrene})$.

Transmission Electron Microscopy (TEM) is for morphology determination. Polymer films are prepared by compression molding followed by fast quenching. The polymer is pre-melted at 190° C. for 1 minute at 1000 psi and then pressed for 2 minutes at 5000 psi and then quenched between chilled platens (15-20° C.) for 2 minutes. The compression molded films are trimmed so that sections could be collected near the core of the films. The trimmed samples are cryopolished prior to staining by removing sections from the blocks at −60° C. to prevent smearing of the elastomer phases. The cryo-polished blocks are stained with the vapor phase of a 2% aqueous ruthenium tetraoxide solution for 3 hrs at ambient temperature. The staining solution is prepared by weighing 0.2 gm of ruthenium (III) chloride hydrate ($RuCl_3 \times H_2O$) into a glass bottle with a screw lid and adding 10 ml of 5.25% aqueous sodium hypochlorite to the jar. The samples are placed in the glass jar using a glass slide having double sided tape. The slide is placed in the bottle in order to suspend the blocks about 1 inch above the staining solution. Sections of approximately 90 nanometers in thickness are collected at ambient temperature using a diamond knife on a Leica EM UC6 microtome and placed on 600 mesh virgin TEM grids for observation.

Image Collection—TEM images are collected on a JEOL JEM-1230 operated at 100 kV accelerating voltage and collected on a Gatan-791 and 794 digital cameras.

Polymer Characterization Methods, a discussion of the methods used may also be found in, e.g., U.S. Patent Publication Nos. 2011/0313106, 2011/0313107, and 2011/0313108. For example, these methods are used with respect to the crystalline block composite and block composite materials discussed below.

Polyoctene Preparation

PO1 and PO2 (the octene based polymer samples) are prepared by using a continuous stirred tank reactor (CSTR). The reactor is approximately 1 gallon in volume. The reactor is hydraulically full and set to operate at steady state conditions. Monomer, Solvent, Catalyst, Cocatalyst-1, Cocatalyst-2 are flowed to the reactor according to process conditions outlined in Table 1, below.

Catalyst-1 is DOC-5215 ([N-[2,6-bis(1-methylethyl)phenyl]-α-[2-(1-methylethyl)phenyl]-6-(1-naphthalenyl)-2-pyridinemethanaminato-κNκN]hafniumdimethyl). Cocatalyst-1 is a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2, are purchased from Boulder Scientific and used without further purification. Cocatalyst-2 (modified methylalumoxane (MMAO)) is purchased from Akzo Nobel and used without purification. The Solvent for the polymerization reaction is a hydrocarbon mixture (ISOPAR'E) obtainable from ExxonMobil Chemical Company and purified through beds of 13-X molecular sieves prior to use.

The process conditions for preparing PO1 and PO2 are shown in Table 1, below.

TABLE 1

| Material | PO1 | PO2 |
|---|---|---|
| Reactor Control Temp.(° C.) | 109 | 98 |
| Solvent Feed (lb/hr) | 27.6 | 27.4 |
| Octene Feed (lb/hr) | 8.0 | 8.0 |
| Ethylene Feed (lb/hr) | 0.0 | 0.0 |
| Hydrogen Feed SCCM | 0.0 | 0.0 |
| Reactor Octene Conc. (g/L) | 117.8 | 118.8 |
| Catalyst Efficiency (gPoly/gM) *1.0E6 | 0.092 | 0.126 |
| Catalyst Flow (lb/hr) | 0.20 | 0.15 |
| Catalyst Conc. (ppm) | 147.9 | 147.9 |
| Cocatalyst-1 Flow (lb/hr) | 0.20 | 0.15 |
| Cocatalyst-1 Conc. (ppm) | 1191.6 | 1191.6 |
| Cocatalyst-2 Flow (lb/hr) | 0.18 | 0.13 |
| Cocatatlyst-2 Conc. (ppm) | 63.0 | 63.0 |

The measured properties of PO1 and PO2 are provided in Table 2, below.

TABLE 2

| | Density (g/cm³) | Melt Index (190° C./ 2.16 kg) | $I_{10}/I_2$ | Mw (kg/mol) | Mn (kg/mol) | Mw/Mn |
|---|---|---|---|---|---|---|
| PO1 | 0.847 | 12.84 | 58.57 | 466 | 140 | 3.33 |
| PO2 | 0.847 | 1.19 | 93.37 | 1265 | 335 | 3.75 |

As shown above, PO1 and PO2 have varying number average molecular weights.

Crystalline Block Composite and Block Composite Preparation and Characterization CBC1 and CBC2 (Crystalline Block Composite) samples are prepared using two continuous stirred tank reactors (CSTR) connected in series. The first reactor is approximately 12 gallons in volume while the second reactor is approximately 26 gallons. Each reactor is hydraulically full and set to operate at steady state conditions. Monomers, Solvent, Catalyst, Cocatalyst-1, Cocatalyst-2, and CSA 1 are flowed to the first reactor according to the process conditions outlined in Table 1. Then, the first reactor contents, as described in Table 1A, below, are flowed to a second reactor in series. Additional Catalyst, Cocatalyst-1, and Cocatalyst-2 are added to the second reactor.

Catalyst, ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium) and Cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2, are purchased from Boulder Scientific and used without further purification.

CSA-1 (diethylzinc or DEZ) and Cocatalyst-2 (modified methylalumoxane (MMAO)) are purchased from Akzo Nobel and used without further purification.

The Solvent is a hydrocarbon mixture (ISOPAR® E) obtainable from ExxonMobil Chemical Company and purified through beds of 13-X molecular sieves prior to use.

The process conditions for preparing CBC1 and CBC2 are shown in Table 3, below.

TABLE 3

| | Material | | | |
|---|---|---|---|---|
| | CBC1 | | CBC2 | |
| | Reactor | | | |
| | 1st Reactor | 2nd Reactor | 1st Reactor | 2nd Reactor |
| Reactor Control Temp.(° C.) | 140 | 135 | 153 | 130 |
| Solvent Feed (lb/hr) | 212 | 245 | 343 | 101 |
| Propylene Feed (lb/hr) | 5.46 | 49.30 | 3.40 | 44.10 |
| Ethylene Feed (lb/hr) | 47.1 | 0.0 | 47.1 | 0.0 |
| Hydrogen Feed SCCM | 9.6 | 9.9 | 0.0 | 0.0 |
| Reactor Propylene Conc. (g/L) | 0 | 2.00 | 0 | 2.42 |
| Catalyst Efficiency (gPoly/gM) *1.0E6 | 0.860 | 0.025 | 0.247 | 0.138 |
| Catalyst Flow (lb/hr) | 1.96 | 2.14 | 0.31 | 0.53 |
| Catalyst Conc. (ppm) | 30 | 900 | 600 | 600 |
| Cocatalyst-1 Flow (lb/hr) | 1.47 | 2.16 | 0.62 | 0.53 |
| Cocatalyst-1 Conc. (ppm) | 400 | 7500 | 2729 | 7082 |
| Cocatalyst-2 Flow (lb/hr) | 0.0 | 0.30 | 0.72 | 0.73 |
| Cocatatlyst-2 Conc. (ppm) | 0.0 | 2686 | 3442 | 1893 |
| DEZ Flow (lb/hr) | 1.94 | 0 | 1.49 | 0 |
| DEZ Conc. (ppm) | 30000 | 0 | 30000 | 0 |

Referring to the above, the resultant CBC1 and CBC2 are an isostatic polypropylene/ethylene-propylene (iPP/E-P) based crystalline block composite that include 50 wt % of iPP and 50 wt % of the ethylene-propylene (having an ethylene content of 93 mol %/90 wt %).

BC1 (Block Composite) samples are synthesized in dual reactors in series, using a similar method as described above with respect to the CBC1 and CBC2 samples.

The process conditions for preparing BC1 are shown in Table 4, below.

TABLE 4

|  | Material BC1 Reactor | |
| --- | --- | --- |
|  | 1st Reactor | 2nd Reactor |
| Reactor Control Temp.(° C.) | 105 | 114 |
| Solvent Feed (lb/hr) | 351.4 | 462.3 |
| Propylene Feed (lb/hr) | 13.3 | 53.0 |
| Ethylene Feed (lb/hr) | 48.5 | 6.14 |
| Hydrogen Feed SCCM | 0.0 | 0.0 |
| Reactor Ethylene Conc. (g/L) | 5.46 | 0.14 |
| Reactor Propylene Conc. (g/L) | 2.34 | 2.08 |
| Catalyst Efficiency (gPoly/gM) *1.0E6 | 1.44 | 0.50 |
| Catalyst Flow (lb/hr) | 0.81 | 2.42 |
| Catalyst Conc. (ppm) | 50 | 50 |
| Cocatalyst-1 Flow (lb/hr) | 0.23 | 0.24 |
| Cocatalyst-1 Conc. (ppm) | 1795 | 4693 |
| Cocatalyst-2 Flow (lb/hr) | 0.37 | 0.62 |
| Cocatalyst-2 Conc. (ppm) | 494 | 397 |
| DEZ Flow (lb/hr) | 2.75 | 0.0 |
| DEZ Conc. (ppm) | 26000 | 0.0 |

Referring to the above, the resultant BC1 is a block composite is an propylene-ethylene/ethylene-propylene (P-E/E-P) based block composite that include 50 wt % of P-E (having 17 mol %/12 wt % of ethylene content) and 50 wt % of E-P (having 85 mol %/79 wt % of ethylene content).

The measured properties of CBC1, CBC2, and BC1 are provided in Table 5, below.

Crystalline Block Composite Index Calculation and Modified Block Composite Index Calculations With respect to CBC1 and CBC2 the Crystalline Block Composite Index (CBCI) is measured to be 0.707 and 0.566, respectively, based on the method discussed with respect to Table 6, below. With respect to BC1 the Modified Block Composite Index (MBCI), is measured to be 0.654, based on the method discussed with respect to Table 6, below.

In particular, CBCI and MBCI provide an estimate of the quantity of block copolymer within the block composite under the assumption that the ratio of CEB/EB to CAOB/AOB within the diblock is the same as the ratio of ethylene to alpha-olefin in the overall block composite. This assumption is valid for these statistical olefin block copolymers based on the understanding of the individual catalyst kinetics and the polymerization mechanism for the formation of the diblocks via chain shuttling catalysis as described in the specification. This CBCI and MBCI analysis shows that the amount of isolated PP is less than if the polymer was a simple blend of a propylene homopolymer (in this example the CAOP/AOP) and polyethylene (in this example the CEP/EP). Consequently, the polyethylene fraction contains an appreciable amount of propylene that would not otherwise be present if the polymer was simply a blend of polypropylene and polyethylene. To account for this "extra propylene", a mass balance calculation can be performed to estimate the CBCI/MBCI from the amount of the polypropylene and polyethylene fractions and the weight % propylene present in each of the fractions that are separated by HTLC.

The corresponding calculations for CBC1, CBC2, and BC1 are provided in Table 6, below.

TABLE 5

|  | MFR (230° C./ 2.16 kg) | wt % PP from HTLC Separation | Mw Kg/mol | Mw/Mn | Total wt % $C_2$ | Tm (° C.) Peak 1 (Peak 2) | Tc (° C.) | Melt Enthalpy (J/g) | Crystalline Block Composite Index | Modified Block Composite Index |
| --- | --- | --- | --- | --- | --- | --- | --- | --- | --- | --- |
| CBC1 | 7.0 | 14.2 | 104 | 4.48 | 46.9 | 132 (108) | 91 | 97 | 0.707 | not applicable |
| CBC2 | 10.1 | 20.3 | 92 | 3.48 | 48.1 | 130 (105) | 90 | 103 | 0.566 | not applicable |
| BC1 | 5.8 | 17.0 | 110 | 2.65 | 45.8 | 73 | 55 | 44 | not applicable | 0.654 |

TABLE 6

| Line # | Variable | Source | CBCI CBC1 | CBCI CBC2 | MBCI BC1 |
|---|---|---|---|---|---|
| 1 | Overall wt % C3 Total | Measured | 53.100 | 51.900 | 54.300 |
| 2 | wt % C3 in PP block/polymer | Measured | 99.000 | 99.000 | 88.000 |
| 3 | wt % C3 in PE block/polymer | Measured | 10.000 | 10.500 | 21.000 |
| 4 | wt fraction PP (in block or polymer) | Eq. 2 below | 0.484 | 0.468 | 0.500 |
| 5 | wt fraction PE (in block or polymer) | 1-Line 4 | 0.516 | 0.532 | 0.500 |
| | Analysis of HTLC Separation | | | | |
| 6 | wt fraction isolated PP | Measured | 0.142 | 0.203 | 0.170 |
| 7 | wt fraction PE fraction | Measured | 0.858 | 0.797 | 0.830 |
| 8 | wt % C3 in PE-fraction | Eq. 4 below | 45.503 | 39.903 | 47.400 |
| 9 | wt fraction PP-diblock in PE fraction | Eq. 6 below | 0.399 | 0.332 | 0.394 |
| 10 | wt fraction PE in PE fraction | 1-Line 10 | 0.601 | 0.668 | 0.606 |
| 11 | wt fraction Diblock in PE fraction | 10/Line 4 | 0.824 | 0.710 | 0.788 |
| 12 | Crystalline Block Composite Index (CBCI) | Eq. 7.1 below | 0.707 | 0.566 | — |
| 12 | Modified Block Composite Index (MBCI) | Eq. 7.2 below | — | — | 0.654 |

Referring to Table 6, above, the CBCI/MBCI is measured by first determining a summation of the weight % propylene from each component in the polymer according to Equation 1, below, which results in the overall weight % propylene/C3 (of the whole polymer). This mass balance equation can be used to quantify the amount of the PP and PE present in the block copolymer. This mass balance equation can also be used to quantify the amount of PP and PE in a binary blend or extended to a ternary, or n-component blend. For the CBCs and BCs, the overall amount of PP or PE is contained within the blocks present in the block copolymer and the unbound PP and PE polymers.

$$\text{Wt \% C3}_{Overall} = w_{PP}(\text{wt \% C3}_{PP}) + w_{pe}(\text{wt \% C3}_{PE}) \quad \text{Eq. 1}$$

where
$w_{pp}$=weight fraction of PP in the polymer
$w_{PE}$=weight fraction of PE in the polymer
wt % $C3_{PP}$=weight percent of propylene in PP component or block
wt % $C3_{PE}$=weight percent of propylene in PE component or block Note that the overall weight % of propylene (C3) is measured from $C^{13}$ NMR or some other composition measurement that represents the total amount of C3 present in the whole polymer. The weight % propylene in the PP block (wt % $C3_{PP}$) is set to 100 (if applicable) or if otherwise known from its DSC melting point, NMR measurement, or other composition estimate, that value can be put into its place. Similarly, the weight % propylene in the PE block (wt % $C3_{PE}$) is set to 100 (if applicable) or if otherwise known from its DSC melting point, NMR measurement, or other composition estimate, that value can be put into its place. The weight % of C3 is shown in Table 6.

Calculating the Ratio of PP to PE in the crystalline block composite and/or the specified block composite: Based on Equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the block copolymer. For a conventional blend, the weight fraction of PP and weight fraction of PE corresponds to the individual amount of PP and PE polymer present. For the crystalline block composite and the block composite, it is assumed that the ratio of the weight fraction of PP to PE also corresponds to the average block ratio between PP and PE present in this statistical block copolymer.

$$w_{PP} = \frac{\text{wt \% C3}_{Overall} - \text{wt \% C3}_{PE}}{\text{wt \% C3}_{PP} - \text{wt \% C3}_{PE}} \quad \text{Eq. 2}$$

where
$w_{PP}$=weight fraction of PP present in the whole polymer
wt % $C3_{PP}$=weight percent of propylene in PP component or block
wt % $C3_{PP}$=weight percent of propylene in PE component or block To estimate the amount of the block copolymer (diblock) in the Crystalline Block Composite and/or the Block Composite, apply Equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP block present in the diblock copolymer. By substituting the overall weight % C3 of the whole polymer in the left hand side of Equation 3, and the weight fraction of PP (isolated from HTLC) and the weight fraction of PE (separated by HTLC) into the right hand side of Equation 3, the weight % of C3 in the PE fraction can be calculated using Equations 4 and 5. The PE fraction is described as the fraction separated from the unbound PP and contains the diblock and unbound PE. The composition of the isolated PP is assumed to be the same as the weight % propylene in the PP block as described previously.

$$\text{wt \% C3}_{Overall} = w_{PP\ isolated}(\text{wt \% C3}_{PP}) + w_{PE\text{-}fraction}(\text{wt \% C3}_{PE\text{-}fraction}) \quad \text{Eq. 3}$$

$$\text{wt \% C3}_{PE\text{-}fraction} = \frac{\text{wt \% C3}_{Overall} - w_{PPisolated}(\text{wt \% C3}_{PP})}{w_{PE\text{-}fraction}} \quad \text{Eq. 4}$$

$$w_{PE\text{-}fraction} = 1 - w_{PPisolated} \quad \text{Eq. 5}$$

where
- $w_{PPisolated}$ = weight fraction of isolated PP from HTLC
- $w_{PE\text{-}fraction}$ = weight fraction of PE separated from HTLC, containing the diblock and unbound PE
- wt % $C3_{PP}$ = weight % of propylene in the PP; which is also the same amount of propylene present in the PP block and in the unbound PP
- wt % $3_{PE\text{-}fraction}$ = weight % of propylene in the PE-fraction that was separated by HTLC
- wt % $C3_{Overall}$ = overall weight % propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP\text{-}diblock} = \frac{\text{wt \%}\ C3_{PE\text{-}fraction} - \text{wt \%}\ C3_{PE}}{\text{wt \%}\ C3_{PP} - \text{wt \%}\ C3_{PE}} \quad \text{Eq. 6}$$

Where
- wt % $3_{PE\text{-}fraction}$ = weight % of propylene in the PE-fraction that was separated by HTLC (Equation 4)
- wt % $C3_{PP}$ = weight % of propylene in the PP component or block (defined previously)
- wt % $C3_{PE}$ = weight % of propylene in the PE component or block (defined previously)
- $w_{PP\text{-}diblock}$ = weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus, the weight fraction of diblock present in the PE fraction would be weight fraction of PP in the diblock ($w_{PP\text{-}diblock}$) multiplied by two. Another way to calculate this is by dividing the weight fraction of PP in the diblock ($w_{PP\text{-}diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the crystalline block composite index or the modified block composite index, the amount of diblock copolymer is determined by Equation 7.1 or 7.2, respectively. To estimate the CBCI and the MBCI, the weight fraction of diblock in the PE fraction calculated using Equation 6 is divided by the overall weight fraction of PP (as calculated in Equation 2) and then multiplied by the weight fraction of the PE fraction. The value of the CBCI and/or MBCI can range from 0 to 1.0, wherein 1.0 would be equal to 100% diblock and zero would be for a material such as a traditional blend or random copolymer.

$$CBCI = \frac{w_{PP\text{-}diblock}}{w_{PP}} \cdot w_{PE\text{-}fraction} \quad \text{Eq. 7.1 (CBCI)}$$

$$MBCI = \frac{w_{PP\text{-}diblock}}{w_{PP}} \cdot w_{PE\text{-}fraction} \quad \text{Eq. 7.2 (MBCI)}$$

Where
- $w_{PP\text{-}diblock}$ = weight fraction of PP in the diblock separated with the PE-fraction by HTLC (Equation 6)
- $w_{PP}$ = weight fraction of PP in the polymer
- $w_{PE\text{-}fraction}$ = weight fraction of PE separated from HTLC, containing the diblock and unbound PE (Equation 5)

For example, if an isotactic polypropylene block/ethylene-propylene block polymer (diblock polymer) contains a total of 53.3 wt % C3 and is made under the conditions to produce an iPP polymer containing 99 wt % C3 and an PE polymer with 10 wt % C3, the weight fractions of PP and PE are 0.487 to 0.514, respectively (as calculated using Equation 2).

Blend Compositions

The following materials are principally used in the blends compositions and the corresponding appropriate properties are provided below:

PP 1: A polypropylene homopolymer having typical properties of a MFR of 4.0 grams/10 minutes (230° C./2.16 kg) (available from Braskem and having the designation PP H375-04).

PP 2: A polypropylene homopolymer having typical properties of a MFR of 11.0 grams/10 minutes (230° C./2.16 kg) (available from Braskem and having the designation PP D115A).

HDPE 1: A high density polyethylene having typical properties of a MI of 0.80 grams/10 minutes (190° C./2.16 kg) and a density of 0.961 g/cm$^3$ (available from The Dow Chemical Company and having the designation UNIVAL™ HDPE DMDA-6400).

HDPE2: A high density polyethylene having typical properties of a MI of 4.4 grams/10 minutes (190° C./2.16 kg) and a density of 0.952 g/cm$^3$ (available from The Dow Chemical Company and having the designation DOW™ HDPE DMDA-8904).

ENGAGE™ 8100: A an ethylene-octene polymer having typical properties of a MI of 1.0 grams/10 minutes (190° C./2.16 kg) and a density of 0.870 g/cm$^3$ (available from The Dow Chemical Company).

AO: An antioxidant (available as Irganox® B 225 from Ciba).

Compression Molded Examples

Blends for preparation of compression molded samples corresponding to Working Examples 1 to 4 and Comparative Examples A and B, are prepared according to the following approximate formulations and are analyzed with respect to the following properties.

TABLE 8

| Materials | Ex. A | Ex. 1 | Ex. 2 | Ex. B | Ex. 3 | Ex. 4 |
|---|---|---|---|---|---|---|
| Formulations (wt %) | | | | | | |
| CBC1 | — | 5.0 | 5.0 | — | 5.0 | 5.0 |
| PO1 | 10.0 | 5.0 | 20.0 | — | — | — |
| PO2 | — | — | — | 10.0 | 5.0 | 20.0 |
| PP 1 | 36.0 | 36.0 | 36.0 | 36.0 | 36.0 | 36.0 |
| HDPE 1 | 53.9 | 53.9 | 44.9 | 53.9 | 53.9 | 44.9 |
| AO | 0.1 | 0.1 | 0.1 | 0.1 | 0.1 | 0.1 |
| Properties | | | | | | |
| Izod at 23° C. (ft.lb/inch) | 1.3 | 1.9 | 9.9 | 1.3 | 1.9 | 7.7 |
| Izod at 0° C. (ft.lb/inch) | 1.0 | 1.1 | 1.9 | 0.8 | 1.0 | 1.8 |
| Percent Elongation at Break (%) | 19.2 | 85.9 | 95.6 | 18.9 | 56.3 | 26.4 |
| Tensile Modulus (psi) | 108,309 | 109,818 | 84,317 | 113,831 | 118,253 | 86,461 |
| Stress at Yield (psi) | 4279 | 4279 | 3546 | 4094 | 4646 | 3249 |
| Toughness (in * lbf) | 12.9 | 53.7 | 44.1 | 12.1 | 34.8 | 13.3 |

The compounding of the components is performed on HAAKE™ Rheomix 3000 lab mixer, with the rotation set at 50 RPM. The mixer is preheated to 190° C., and the mixing is maintained for 5 minutes at 190° C. after the ram is secured down. During mixing, an additional amount of 0.2 wt % (based on a total weight of 180 gram) of the AO is added to each of the formulations. Following compounding and pelletizing, plaques were prepared by compression molding using a Tetrahedron press where the pellets are pre-melted at 190° C. for 1 minute at 5,000 pounds of pressure and then pressed at 190° C. for 4 minutes at 40,000 pounds of pressure using a 12×12×0.126 inches mold (capable of temperatures from 60° F. to 100° F., depending on the material being compression molded as would be understood by a person of ordinary skill in the art). The plaques were subsequently quick quench cooled in an ice bath immediately upon removal from the press.

Referring to Table 8, compared to Comparative Example A, with the addition of CBC1, Working Example 1 shows improvements with respect to Izod impact strength, percent elongation at break, and toughness, without showing diminished properties with respect to tensile modulus and stress at yield. Referring to Working Example 2, at an increased concentration of PO1 in addition to CBC1, a significant improvement with respect to Izod impact strength is realized, with the start of obtaining diminished properties with respect to tensile modulus and stress at yield. Accordingly, there is an upper limit with respect to the amount of PO1 that may be added to the blend, without obtaining significantly diminished properties with respect to tensile modulus and stress at yield.

In addition, referring to FIG. 1, TEM Morphology is shown for a PP phase (bright phase) dispersed in an HDPE matrix (grey color phase) for Comparative Example A and Working Example 1. Polyoctene (dark phase) resides in PP phase in both of Comparative Example A and Working Example 1. However, referring to Working Example 1, the PP phase size is significantly smaller coupled with improved dispersion of the polyoctene within the PP phase, showing the effect of compatibilization.

Referring to Table 8, Compared to Comparative Example B, with the addition of CBC1, Working Example 3 shows improvements with respect to Izod impact strength, percent elongation at break, and toughness, with also showing improved properties with respect to tensile modulus and stress at yield. Referring to Working Example 3, at an increased concentration of PO2 in addition to CBC1, a significant improvement with respect to Izod impact strength is realized, with the start of obtaining diminished properties with respect to tensile modulus and stress at yield. Accordingly, there is an upper limit with respect to the amount of PO2 that may be added to the blend, without obtaining significantly diminished properties with respect to tensile modulus and stress at yield.

Testing of properties is carried out in the ASTM lab according to standard ASTM methods. For the compression molding data, quenched cooled type plaque testing is reported. Flexural Testing (including Flex Modulus) is measured according to ASTM D790@0.5 in/min Tensile Properties (including Tensile Modulus, Strain at Break, and Stress at Yield) are measured according to ASTM D636 @ 2 in/min Izod Impact Testing (at each of 23° C., 0° C., −18° C.) is performed according to ASTM D256.

Injection Molded Examples

Blends for preparation of injection molded samples corresponding to Working Examples 5 and 6, and Comparative Examples C to G, are prepared according to the following approximate formulations and are analyzed with respect to the following properties.

TABLE 9

| Materials | Ex. C | Ex. D | Ex. E | Ex. F | Ex. 5 | Ex. 6 | Ex. G |
|---|---|---|---|---|---|---|---|
| Formulations (wt %) | | | | | | | |
| CBC2 | — | — | — | — | 5.0 | — | 5.0 |
| BC1 | — | — | — | — | — | 5.0 | — |

TABLE 9-continued

| Materials | Ex. C | Ex. D | Ex. E | Ex. F | Ex. 5 | Ex. 6 | Ex. G |
|---|---|---|---|---|---|---|---|
| PO2 | — | — | 8.0 | 8.0 | 8.0 | 8.0 | — |
| ENGAGE ™ 8100 | — | 8.0 | — | 8.0 | 8.0 | 8.0 | 8.0 |
| PP 2 | 35.0 | 31.0 | 31.0 | 26.0 | 24.0 | 24.0 | 28.0 |
| HDPE 2 | 64.9 | 60.9 | 60.9 | 56.9 | 54.9 | 54.9 | 58.9 |
| AO | 0.1 | 0.1 | 0.1 | 0.1 | 0.1 | 0.1 | 0.1 |
| Properties | | | | | | | |
| Average Tensile Strain at Break (%) | 31 | 75 | 76 | 138 | 119 | 104 | 66 |
| Flex Modulus (kpsi) | 194 | 168 | 160 | 119 | 125 | 117 | 153 |
| Izod at 23° C. (ft.lb/inch) | 0.8 | 9.9 | 1.5 | 10.7 | 12.4 | 9.8 | 11.1 |
| Izod at 0° C. (ft.lb/inch) | 0.7 | 1.8 | 1.1 | 9.9 | 12.4 | 13.5 | 3.6 |
| Izod at −18° C. (ft.lb/inch) | 0.6 | 1.4 | 0.9 | 2.0 | 4.3 | 10.6 | 1.5 |
| Tensile Strain at Break × Izod at 23° C. | 23 | 746 | 116 | 1476 | 1473 | 1024 | 730 |
| Tensile Strain at Break × Izod at 0° C. | 20 | 133 | 82 | 1372 | 1477 | 1403 | 239 |
| Tensile Strain at Break × Izod at −18° C. | 20 | 103 | 72 | 276 | 507 | 1099 | 101 |

To prepare the Examples, all the materials are blended together in a KOBELCO batch mixer (5 lbs) at temperatures ranging from 120° C. to 200° C. Rotation begins at 100 RMP and is dropped to 50 RPM on each batch to cool the blend for pulverizing in the mixer at around 120° C. During mixing, an additional 0.1% AO is added to each of the formulations. The pulverized material is then compounded on a ZSK30 twin screw extruder using a general purpose screw. Temperature is maintained at 200° C. and screw RMP of 200. The product is pelletized and injection molded into 4"×6"×3.3 mm plaques using KRAUSS MAFFEI KM110 injection molding machine. Polymer is melted at 200° C. and injected at a pressure of 2000 bar over 3.0 to 3.5 seconds. The mold temperature is held at 70° C. Mold pressure is maintained at 200-300 bars depending on the material composition for 30 seconds. Cooling time is 20 seconds. The nominal plaque thickness is 0.125 inches.

Referring to Table 9, it is seen that for Comparative Example C, which only includes PP 2 and HDPE 2, poor properties are realized with respect to with respect to tensile strain, flex modulus, and Izod impact strength. For Comparative Example D, which adds an ethylene based copolymer that includes octene, an improvement is seen; however, at least undesirable low temperature performance (−18° C.) with respect to Izod impact strength is seen. For Comparative Example E, the addition of PO2 without CBC2 or BC1, results in similar improvements with a similar undesirable low temperature performance with respect to Izod impact strength. For Comparative Example F that combines the ethylene based copolymer with PO2, without CBC2 or BC1, significant improvements with respect to average tensile strain are realized, but a similar undesirable low temperature performance with respect to Izod impact strength is seen.

Accordingly, referring to Working Examples 5 and 6, good properties are realized with respect to the measured properties, with desirable low temperature performance with respect to Izod impact strength. Referring to Comparative Example G, it is further shown that without PO2, and instead with CBC2 coupled with the ethylene based copolymer, the same desired results are not seen.

Polypropylene rich blends for preparation of injection molded samples (prepared using the same method as discussed above with respect to the polyethylene rich blends), corresponding to Working Example 7 and Comparative Examples H to K, are prepared according to the following approximate formulations and are analyzed with respect to the following properties.

TABLE 10

| Materials | Ex. H | Ex. I | Ex. J | Ex. K | Ex. 7 |
|---|---|---|---|---|---|
| Formulations (wt %) | | | | | |
| BC1 | — | — | — | — | 5.0 |
| PO2 | — | — | 8.0 | 8.0 | 8.0 |
| ENGAGE ™ 8100 | — | 8.0 | — | 8.0 | 8.0 |
| PP 2 | 64.9 | 60.9 | 60.9 | 56.9 | 54.9 |
| HDPE 2 | 35.0 | 31.0 | 31.0 | 26.0 | 24.0 |
| AO | 0.1 | 0.1 | 0.1 | 0.1 | 0.1 |
| Properties | | | | | |
| Tensile Strain at Break (%) | 14 | 50 | 62 | 138 | 104 |
| Flex Modulus (kpsi) | 225 | 198 | 187 | 119 | 117 |
| Izod at 23° C. (ft · lb/inch) | 0.6 | 1.5 | 1.2 | 10.7 | 9.8 |
| Izod at 0° C. (ft · lb/inch) | 0.4 | 0.9 | 0.8 | 9.9 | 13.5 |
| Izod at −18° C. (ft · lb/inch) | 0.4 | 0.7 | 0.6 | 2.0 | 10.6 |
| Tensile Strain at Break × Izod at 23° C. | 8 | 73 | 76 | 1476 | 1024 |
| Tensile Strain at Break × Izod at 0° C. | 6 | 44 | 50 | 1372 | 1403 |
| Tensile Strain at Break × Izod at −18° C. | 5 | 36 | 39 | 276 | 1099 |

Referring to Table 10, it is seen that for Comparative Example H, which only includes PP 2 and HDPE 2, poor properties are realized with respect to with respect to tensile strain, flex modulus, and Izod impact strength. For Comparative Example I, which adds an ethylene based copolymer that includes octene, an improvement is seen; however, at least undesirable low temperature performance (−18° C.) with respect to Izod impact strength is seen. For Comparative Example J, the addition of PO2 without CBC2 or BC1, results in similar improvements with a similar undesirable low temperature performance with respect to Izod impact strength. For Comparative Example K that combines the ethylene based copolymer with PO2, without CBC2 or BC1, significant improvements with respect to average tensile strain are realized, but a similar undesirable low temperature performance with respect to Izod impact strength is seen.

Accordingly, referring to Working Example 7, good properties are realized with respect to the measured properties, with desirable low temperature performance with respect to Izod impact strength.

Testing of properties is carried out in the ASTM lab according to standard ASTM methods. For the injection molding data, machine direction type plaque testing is reported. Flexural Testing is measured according to ASTM D790 @ 0.5 in/min Tensile Properties are measured according to ASTM D636 @ 2 in/min. Izod Impact Testing (at each of 23° C., 0° C., −18° C.) is performed according to ASTM D256.

What is claimed is:

1. A composition, comprising:
   (A) from 10 wt % to 86 wt % of an ethylene component including at least one ethylene based polymer having an ethylene content of at least 50.0 wt %, based on the total weight of the ethylene based polymer, a melt index from 0.1 g/10 min to 100.0 g/10 min (ASTM D-1238 at 190° C., 2.16 kg), and a density from 0.935 g/cm$^3$ to 0.965 g/cm$^3$;
   (B) from 10 wt % to 86 wt % of a propylene component including at least one propylene based polymer having a propylene content of at least 50.0 wt %, based on the total weight of the propylene based polymer, and a melt flow rate from 0.5 g/10 min to 200.0 g/10 min (ASTM D-1238 at 230° C., 2.16 kg);
   (C) from 2 wt % to 22 wt % of an octene component including at least one octene based polymer having an octene content of at least 80 wt %, based on the total weight of the octene based polymer; and
   (D) from 2 wt % to 20 wt % of a composite component including at least one selected from the group of a crystalline block composite and a specified block composite, derived from at least ethylene and an alpha-olefin that is one of a $C_{3-10}$ alpha-olefin, wherein:
   the crystalline block composite includes a crystalline ethylene based polymer having an ethylene content of greater than 90 mol %, a crystalline alpha-olefin based polymer that is derived from at least the alpha-olefin, and a block copolymer comprising a crystalline ethylene block and a crystalline alpha-olefin block, the crystalline ethylene block of the block copolymer having the same composition as the crystalline ethylene based polymer in the block composite, and the crystalline alpha-olefin block of the block copolymer having the same composition as the crystalline alpha-olefin based polymer of the block composite, and
   the specified block composite includes an ethylene based polymer having an ethylene content from 69 mol % and to 90 mol %, an alpha-olefin based polymer that is derived from at least the alpha-olefin, and a block copolymer comprising an ethylene block and an alpha-olefin block, the ethylene block of the block copolymer having the same composition as the ethylene based polymer in the block composite, and the alpha-olefin block of the block copolymer having the same composition as the alpha-olefin based polymer of the block composite.

2. The composition as claimed in claim 1, wherein the alpha-olefin is propylene.

3. The composition as claimed in claim 1, wherein:
   at least the crystalline block composite is present in the composite component and the a crystalline alpha-olefin based polymer has an alpha-olefin content greater than 90 mol %; and
   the crystalline block composite has a crystalline block composite index that is greater than 0 and less than 1.0.

4. The composition as claimed in claim 1, wherein:
   at least the specified block composite is present in the composite component and the alpha-olefin based polymer has an alpha-olefin content of from 61 mol % to 90 mol %; and
   the specified block composite has a modified block composite index that is greater than 0 and less than 1.0.

5. The composition as claimed in claim 1, wherein the octene based polymer has a weight average molecular weight from 200 kg/mol to 1500 kg/mol and a ratio of Mw/Mn from 2 to 10.

6. The composition as claimed in claim 1, wherein the octene based polymer has a density from 0.840 g/cm$^3$ to 0.855 g/cm$^3$.

7. The composition as claimed in claim 1, wherein the ethylene based polymer has from a density from 0.935 g/cm$^3$ to 0.965 g/cm$^3$.

8. The composition as claimed in claim 1, wherein the propylene based polymer has a density from 0.870 g/cm$^3$ to 0.910 g/cm$^3$.

9. A post-consumer recycled blend comprising the composition as claimed in claim 1.

10. A post consumer plastic resin comprising the composition as claimed in claim 1.

* * * * *